United States Patent [19]
Lee et al.

[11] Patent Number: 6,049,643
[45] Date of Patent: Apr. 11, 2000

[54] MODAL EVOLUTION OPTICAL COUPLER AND METHOD FOR MANUFACTURING THE COUPLER

[75] Inventors: Yong-woo Lee, Yongin; Byong-gwon You, Daejeon; Tao-hyung Rhee, Sungnam, all of Rep. of Korea

[73] Assignee: SamSung Electronics Co., Ltd., Kyungki-do, Rep. of Korea

[21] Appl. No.: 08/972,398

[22] Filed: Nov. 18, 1997

[30] Foreign Application Priority Data

Nov. 18, 1996 [KR] Rep. of Korea ................. 9655042

[51] Int. Cl.[7] ................................................ G02B 6/26
[52] U.S. Cl. ................................. 385/28; 385/43
[58] Field of Search ............................ 385/12, 13, 27, 385/28, 43, 39

[56] References Cited

U.S. PATENT DOCUMENTS

| | | | |
|---|---|---|---|
| 4,181,399 | 1/1980 | McMahon et al. | 350/96.14 |
| 4,291,939 | 9/1981 | Giallorenzi et al. | 350/96.14 |
| 4,544,231 | 10/1985 | Peterson | 350/96.15 |
| 4,568,408 | 2/1986 | Schmadel et al. | 156/626 |
| 5,123,069 | 6/1992 | Okayama et al. | 385/16 |
| 5,179,606 | 1/1993 | Kaihara et al. | 385/45 |
| 5,265,178 | 11/1993 | Braun et al. | 385/24 |
| 5,278,926 | 1/1994 | Doussiere | 385/28 |
| 5,301,252 | 4/1994 | Yanagawa et al. | 385/96 |
| 5,337,380 | 8/1994 | Darbon et al. | 385/28 |
| 5,410,626 | 4/1995 | Okuta et al. | 385/43 |
| 5,420,948 | 5/1995 | Byron | 385/37 |
| 5,475,777 | 12/1995 | Imoto et al. | 385/28 |
| 5,479,546 | 12/1995 | Dumais et al. | 385/43 |
| 5,515,464 | 5/1996 | Sheem | 385/49 |
| 5,537,497 | 7/1996 | Nelson | 385/22 |
| 5,577,141 | 11/1996 | Adar et al. | 385/43 |
| 5,586,205 | 12/1996 | Chen et al. | 385/29 |
| 5,675,679 | 10/1997 | Yuuki | 385/43 |

FOREIGN PATENT DOCUMENTS

| | | | |
|---|---|---|---|
| 2 548 792 A1 | 1/1985 | France | G02B 6/26 |
| 2143650 | 2/1985 | United Kingdom | G02B 5/14 |
| 2283579 | 10/1995 | United Kingdom | G02B 6/24 |

*Primary Examiner*—John D. Lee
*Assistant Examiner*—Victoria D. Hao
*Attorney, Agent, or Firm*—Robert E. Bushnell, Esq.

[57] ABSTRACT

A modal evolution coupler having a low-loss or non-loss effect when a transmitted light passes through an optical fiber and is output via an expanding element, includes: a first optical fiber which gradually, thermally expands a core to evolute the mode of a transmitted light, a second optical fiber which gradually, thermally expands a core to evolute the mode of a transmitted light, an expanding element which is placed between the first and second optical fibers, and is formed of an ultraviolet curing resin, and has ends whose section areas are equal to the respective ends of the first and second expanded optical fibers when an ultraviolet ray is incident thereon and cured, and includes expanded portions which are each expanded over a predetermined expansion distance starting from a connecting portion to the first or second optical fiber and a middle portion keeping its size constant for a predetermined length between the expanded portions of the first and second optical fibers, and does not move in the expansion distance, a channel transmission path which has two ends to which the first and second optical fibers are respectively connected and allows the transmitted light to be output after the expanding element is filled between the optical fibers placed on the ends thereof, and a coverlet positioned on the channel transmission path to enable a filling of the channel transmission path with an ultraviolet curing resin while aligning the first and second optical fibers and to prevent the resin from flowing out of the channel transmission path. Accordingly, the expansion distance of a core is long, so that an expanding element formed by ultraviolet ray irradiation is prevented from moving. Also, a loss of the transmitted light due to an influence of a resin existing between the section of an optical fiber and the wall of the channel transmission path is remarkably reduced. Furthermore, the use of a U- or V-shaped groove makes it possible for the optical fibers to be self-aligned and an emission loss is reduced.

22 Claims, 5 Drawing Sheets

MODAL EVOLUTION OPTICAL COUPLER AND METHOD FOR MANUFACTURING THE COUPLER

CLAIM OF PRIORITY

This application makes reference to, incorporates the same herein, and claims all benefits accruing under 35 U.S.C. §119 from an application for MODAL EVOLUTION OPTICAL COUPLER AND METHOD FOR MANUFACTURING THE SAME earlier filed in the Korean Industrial Property Office on the 18$^{th}$ of Nov. 1996 and there duly assigned Ser. No. 55042/1996.

BACKGROUND OF THE INVENTION

1. Field of the Invention

The present invention relates to an optical coupler, and more particularly, to a modal evolution optical coupler in which a low-loss optical transmission is accomplished, and a method for manufacturing the coupler.

2. Description of Related Art

Propagation of light by reflection and refraction is determined by the incident angle of the light and the refractive indices of two media. Accordingly, the development of a medium capable of more effectively propagating light is very important in optical communications. An optical fiber is the most widely used medium for transmitting light. The optical fiber includes an internal core for transmitting light and a cladding having a different refractivity for accomplishing a total reflection of light in the core. A core having a diameter ranging from about 8 $\mu$m to 200 $\mu$m (0.2 mm) is usually used for transmitting light. The small diameter of the core portion causes significant technical difficulties in connecting optical fibers or branching and coupling transmitted light.

An optical coupler is a passive device for branching or coupling an optical signal. The function of branching or coupling an optical signal in optical communications can be simply performed by various photomechanical connections, similar to branching or coupling in electric communications. However, the optical signal cannot be simply realized because of the characteristics of the optical fiber, so that a special optical coupler is employed as a light branching and coupling device.

An optical coupler using an optical fiber which has been the most widely used since the 1970's is a fused coupler which uses an evanescent field coupling method. The fused coupler is manufactured by twisting several optical fibers together and then commonly fusing and tensing the twisted fibers. Every dielectric single-mode waveguide including an optical fiber has an evanescent electromagnetic field which decreases exponentially to the exterior of a core. Accordingly, when two single-mode waveguides are disposed adjacent to each other, a wavemode is excited by an evanescent field of adjacent cores and a combination of optical signals occurs. Such a combination is called an evanescent field combination, and is used by the fused coupler. However, the fused coupler requires a complicated and time consuming manufacturing process, is expensive and it is not likely that the price of the fused coupler will go down.

As another coupler, a waveguide coupler may be used. The waveguide coupler branches or couples light by a quartz glass waveguide formed on a silicon substrate or a waveguide using an ion exchange glass. A small coupler can be produced in large quantities when the waveguide technique is used. However, several technical problems remain such as losses of the waveguide itself, as losses in an optical fiber connection or an improvement in a waveguide forming technique.

As still another coupler, there is a direct-combination core extension coupler using an extension element which has extended the core of an optical fiber in a channel transmission path. The extending element extends light transmitted via a core to have a much larger section centered on the core. An optical coupler can be designed by applying the extension element. Several optical fibers having well cut ends are put together in order. When the extension element is formed from the cut section of each optical fiber, the section areas of the extension elements increase. Consequently, the extension elements touch and combine with each other at a certain distance or more. Once the extension elements combine with each other and form a body, light is branched or two or more light beams are coupled. The coupler easily connects light beams to each other compared to the fused coupler or the waveguide coupler, thereby allowing simple branching or coupling of optical fibers. Also, there is a high probability that the price of the coupler will go down. However, since the core extension is long when extending a core in the channel transmission path, an extension element formed by ultraviolet rays tends to move. Also, light transmission losses are increased by an influence of a resin existing between the section of an optical fiber and the wall of a channel transmission path, etc. The performance of the coupler is remarkably deteriorated, so that the coupler cannot be effectively used as a coupler.

The following patent each disclose features in common with the present invention but do not teach or suggest the specifically recited modal evolution optical coupler of the present invention: U.S. Pat. No. 5,278,926 to Doussiere, entitled Widened Output Mode Semiconductor Optical Component And Method Of Fabricating It, U.S. Pat. No. 5,123,069 to Okayama et al., entitled Waveguide-Type Optical Switch, U.S. Patent No. 4,291,939 to Giallorenzi et al., entitled Polarization-Independent Optical Switches/Modulators, U.S. Pat. No. 4,181,399 to McMahon et al., entitled Optical Internal Reflectance Switchable Couple,; U.S. Pat. No. 5,537,497 to Nelson, entitled Optimized Electrode Geometries For Digital Optical Switches, U.S. Pat. No. 5,586,205 to Chen et al., entitled Apparatus For Selecting Waveguide Modes In Optical Fiber And The Method Of Manufacturing The Same, U.S. Pat. No. 5,475,777 to Imoto et al., entitled Optical Device With A Pig Tail Optical Fiber And Its Production Method, U.S. Pat. No. 5,479,546 to Dumais et al., entitled Optimized Non-Linear Effect Tapered Optical Fiber Interferometer/Switch Device, U.S. Pat. No. 5,265,178 to Braun et al., entitled Fiber Optic Data Communication System, U.S. Pat. No. 5,301,252 to Yanagawa et al., entitled Mode Field Conversion Fiber Component, U.S. Pat. No. 5,337,380 to Darbon et al., entitled Method Of Limiting Coupling Losses Between Monomode Optical Fibers Using A Piece Of Multimode Optical Fiber, U.S. Pat. No. 5,179,606 to Kaihara et al., entitled Optical Coupler, U.S. Pat. No. 5,675,679 to Yuuki, entitled Light Branching And Coupling Device, U.S. Pat. No. 5,515,464 to Sheem, entitled Optical Fiber Interconnections Using Self-Aligned Core-Extensions, U.S. Pat. No. 5,410,626 to Okuta et al., entitled Optical Coupler Having A Tapered Fused Region, and U.S. Pat. No. 5,420,948 to Byron, entitled Chirped Optical Fiber Filter.

SUMMARY OF THE INVENTION

To solve the above problems of the direct combination core extension coupler, it is an object of the present invention to provide a modal evolution optical coupler having a no-loss optical transmission by making a new extension element which does not move by achieving a modal evolution of a transmission light which is not dependent of the distance of the core extension and receives no influence of a resin existing between the section of an optical fiber and the wall of a channel transmission path, and a method for manufacturing the coupler.

To accomplish the above object, there is provided a modal evolution optical coupler comprising: a first optical fiber which gradually, thermally expands a core to evolute the mode of a transmitted light; a second optical fiber which gradually, thermally expands a core to evolute the mode of a transmitted light; an expanding element which is disposed between the first and second optical fibers, and which is formed of an ultraviolet curing resin, and which has ends whose section areas are equal to the respective ends of the first and second expanded optical fibers when an ultraviolet ray is incident thereon and cured, and which includes expanded portions which are each expanded over a predetermined expansion distance starting from a connecting portion to the first or second optical fiber and a middle portion keeping its size constant for a predetermined length between the expanded portions of the first and second optical fibers, and which does not move in the expansion distance; a channel transmission path which has two ends to which the first and second optical fibers are respectively connected and which allows the transmitted light to be output after the expanding element is disposed between the optical fibers placed on the two ends thereof; and a coverlet positioned on the channel transmission path to enable a filling of the channel transmission path with an ultraviolet curing resin while aligning the first and second optical fibers and to prevent the resin from flowing out of the channel transmission path.

To accomplish the above object, there is also provided a modal evolution optical coupler comprising: a first optical fiber which gradually, thermally expands a core to evolute the mode of a transmitted light; a second optical fiber which gradually, thermally expands a core to evolute the mode of a transmitted light; a third optical fiber which gradually, thermally expands a core to evolute the mode of a transmitted light; a Y-shaped expanding element which has one end connected to the first optical fiber and two other ends respectively connected to the second and third optical fibers, and which is formed of an ultraviolet curing resin, and having three ends in which each section area thereof is the same as each end of the first, second and third expanded optical fibers when an ultraviolet ray is incident thereon and cured, and including expansion portions which are each expanded over a predetermined expansion distance starting from a connecting portion to the first, second or third optical fiber and a Y-shaped middle portion keeping its size constant between the expanded portions of the first, second and third optical fibers, and which does not move in the expansion distance; a channel transmission path which has one end to which the first optical fiber is connected and another end to which the second and third optical fibers are connected, and which allows the transmitted light to be output after the expanding element is disposed between the optical fibers placed on the ends thereof; and a coverlet positioned on the channel transmission path to enable a filling of the channel transmission path with an ultraviolet curing resin while aligning the first, second and third optical fibers and to prevent the resin from flowing out of the channel transmission path.

To accomplish the above object, there is also provided a modal evolution optical coupler comprising: a first optical fiber having a connection portion which gradually, thermally expands a part of core to evolute the mode of a transmitted light and a continued portion which is connected to the connection portion and keeps its size constant for a predetermined length; a second optical fiber having a connection portion which gradually, thermally expands a part of core to evolute the mode of a transmitted light and a continued portion which is connected to the connection portion and keeps its size constant for a predetermined length; an expanding element which is disposed between the first and second optical fibers, and which is formed of an ultraviolet curing resin, having two ends whose section areas are the same as the respective ends of the first and second expanded optical fibers when an ultraviolet ray is incident thereon and cured, including expanded portions which are each shrunk and again expanded over a predetermined expansion distance starting from a connecting portion to the first or second optical fiber and a middle portion keeping its size constant for a predetermined length between the expanded portions of the first and second optical fibers, and which does not move in the expansion distance; a channel transmission path which has two ends to which the continued portions of said first and second optical fibers are respectively connected and which allows the transmitted light to be output after the expanding element is disposed between the optical fibers placed on the ends thereof; and a coverlet positioned on the channel transmission path to enable a filling of the channel transmission path with an ultraviolet curing resin while aligning the first and second optical fibers and to prevent the resin from flowing out of the channel transmission path.

To accomplish the above object, there is still further provided a modal evolution optical coupler comprising: a first optical fiber having a connection portion which gradually, thermally expands a part of core to evolute the mode of a transmitted light and a continued portion which is connected to the connection portion and keeps its size constant for a predetermined length; a second optical fiber having a connection portion which gradually, thermally expands a part of core to evolute the mode of a transmitted light and a continued portion which is connected to the connection portion and keeps its size constant for a predetermined length; a third optical fiber having a connection portion which gradually, thermally expands a part of core to evolute the mode of a transmitted light and a continued portion which is connected to the connection portion and keeps its size constant for a predetermined length; a Y-shaped expanding element which has one end connected to the continued portion of the first optical fiber and two other ends respectively connected to the continued portions of the second and third optical fibers, and which is formed of an ultraviolet curing resin, having three ends whose each section area is the same as each end of the first, second and third expanded optical fibers when an ultraviolet ray is incident thereon and cured, including expanded portions which are each first shrunk and then expanded over a predetermined expansion distance starting from a connecting portion to the first, second or third optical fiber and a Y-shaped middle portion keeping its size constant between the expanded portions connected to the continued portions of the first, second and third optical fibers, and which does not move in the expansion distance; a channel transmission path which has one end to which the continued portion of the first optical fiber is connected and another end to which the continued portions of the second and third optical fibers are connected, and which allows the transmitted light to be output after the expanding element is disposed between the optical fibers placed on the ends thereof; and a coverlet positioned on the channel transmission path to enable a filling of the channel transmission path with an ultraviolet curing resin while aligning the first, second and third optical fibers and to prevent the resin from flowing out of the channel transmission path.

Preferably, a method for manufacturing a modal evolution optical coupler according to an embodiment of the present invention comprises the steps of: installing an optical fiber on the channel transmission path by pressing down on the optical fibers; placing an optical transmission medium as the core expanding element on the channel transmission path; and covering a part of the optical fiber and the core expanding element with a coverlet.

Preferably, a method for manufacturing a modal evolution optical coupler according to another embodiment of the present invention comprises the steps of: placing a coverlet on the channel transmission path; filling the channel transmission path with resin; and inserting an optical fiber into said resin existing in the channel transmission path.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
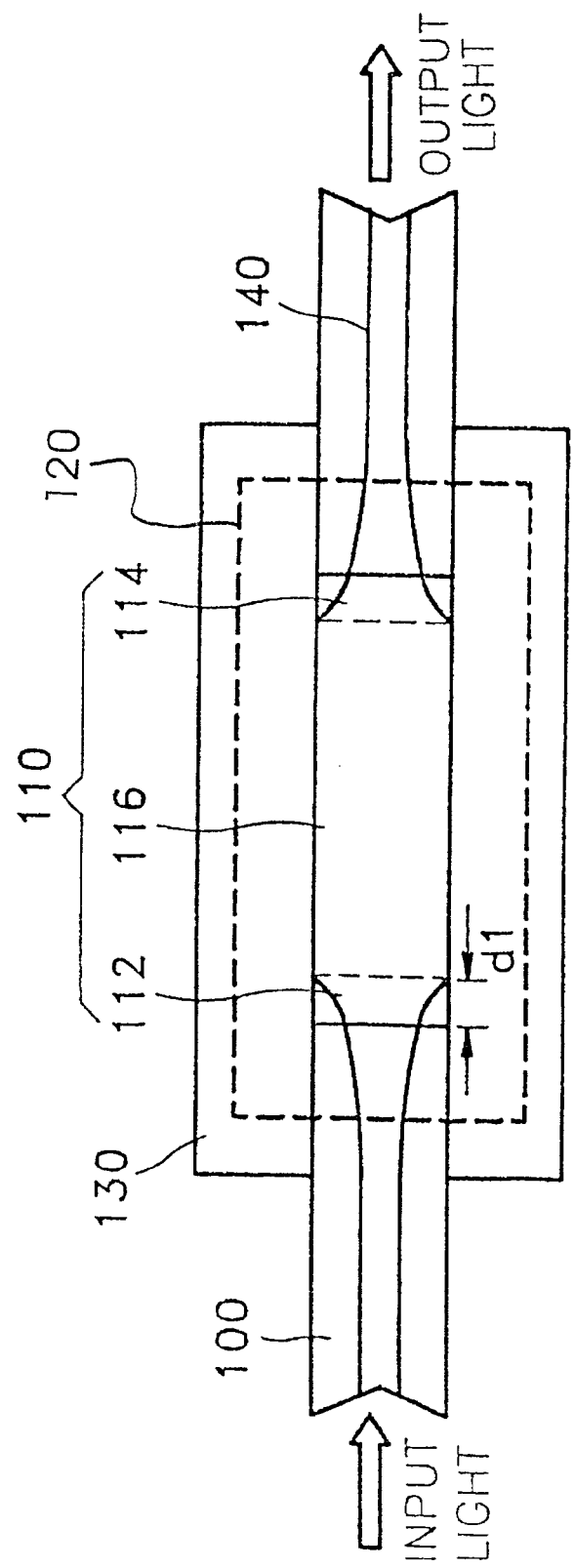
FIG. 1 shows the structure of a 1×1 optical coupler according to the present invention which accomplishes a modal evolution with an optical fiber having a core gradually enlarged from a part of a communications optical fiber and is positioned at the front end of an expanding element.

Referring to FIG. 1, a 1×1 optical coupler is comprised of first and second optical fibers 100 and 140, an expanding element 110, a coverlet 120, and a channel transmission path 130.

The first and second optical fibers 100 and 140 gradually and thermally expand the respective cores to accomplish a modal evolution of a transmission light.

The expanding element 110, placed between the first and second optical fibers 100 and 140, is composed of an ultraviolet curing resin and does not move in an axial direction. When an ultraviolet ray is incident thereon and cured, the section area at either end is the same as one end of each of the expanded first and second optical fibers 100 and 140. The expanding element 110 is comprised of expansion portions 112 and 114 each enlarged over a predetermined expansion distance (d1) starting from a portion connected to the first or second optical fiber 100 or 140, and a middle portion 116 which uniformly keeps its size for a predetermined length between the expanded portion connected to the first optical fiber and that connected to the second optical fiber. The internal refractive index of the expanding element 110 is greater than that of the coverlet 120 installed outside the expanding element 110 and that of the rectilinear channel transmission path 130, so that a transmission light is internally confined and keeps traveling.

The channel transmission path 130 has two ends on which the first and second optical fibers 100 and 140 are respectively placed, and allows the transmission light to be output after the expanding element 110 is filled between the optical fibers positioned on the ends thereof.

The coverlet 120 fills the channel transmission path 130 with the ultraviolet curing resin simultaneously with the alignment of the first and second optical fibers 100 and 140, and is placed on the channel transmission path 130 to prevent the resin from flowing outside the channel transmission path 130.

Figure 2:
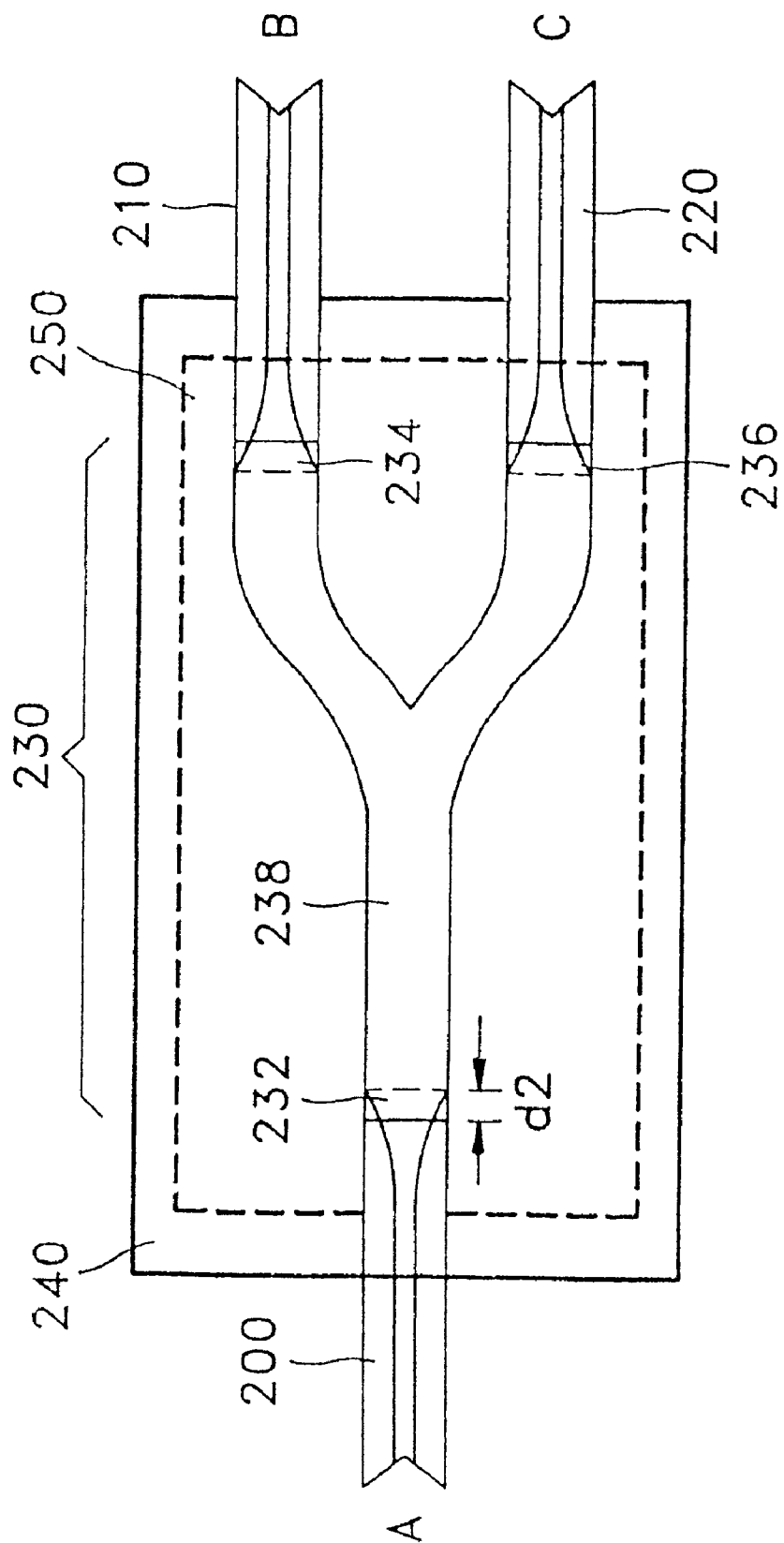
FIG. 2 shows the structure of a 1×2 optical coupler according to the present invention which accomplishes a modal evolution with an optical fiber having a core gradually enlarged from a part of a communications optical fiber and is positioned at the front end of an expanding element.

FIG. 2 shows the structure of a 1×2 optical coupler according to the present invention which accomplishes a modal evolution while an optical fiber having a core gradually enlarged from a part of a communications optical fiber is positioned at the front end of an expanding element. The 1×2 optical coupler is comprised of first, second and third optical fibers 200, 210 and 220, an expanding element 230, a channel transmission path 240 and a coverlet 250.

The first, second and third optical fibers 200, 210 and 220 thermally and gradually expand a core to accomplish a modal evolution of a transmission light.

The expanding element 230 is Y-shaped, and has one end connected to the first optical fiber 200 and two other ends connected to the second and third optical fibers 210 and 220, respectively. The expanding element 230 is composed of an ultraviolet curing resin. When an ultraviolet ray is incident thereon and cured, the section areas of the respective ends of the expending element 230 are the same as the respective ends of the first, second and third optical fibers 200, 210 and 220. The expanding element 230 includes expansion portions 232, 234 and 236 each enlarged over a predetermined expansion distance (d2) starting from a portion connected to the first, second or third optical fiber 200, 210 or 220, and a middle portion 238 having a consistent size between the expansion portions 232, 234 and 236 respectively connected to the first, second and third optical fibers 200, 210 and 220. The expanding element 230 does not move in the expansion distance (d2). Also, the expanding element 230 has a shape which is continued after gradually extending up to the expanding distance (d2) and reaches the wall of the Y-shaped channel transmission path 240. The internal refractive index of the expanding element 230 is larger than that of the coverlet 250 installed outside the expanding element 230 and that of the Y-shaped channel transmission path 240.

The channel transmission path 240 has one end to which the first optical fiber 200 is connected, and another end to which the second and third optical fibers 210 and 220 are connected. After the expanding element is filled between the optical fibers positioned at either end of the channel transmission path 240, the channel transmission path 240 allows a transmission light to be output. The coverlet 250 is placed on the channel transmission path 240 to fill the channel transmission path 240 with the ultraviolet curing resin without flowing out of the channel transmission path 240 simultaneously with the alignment of the first, second and third optical fibers 200, 210 and 220.

Figure 3:
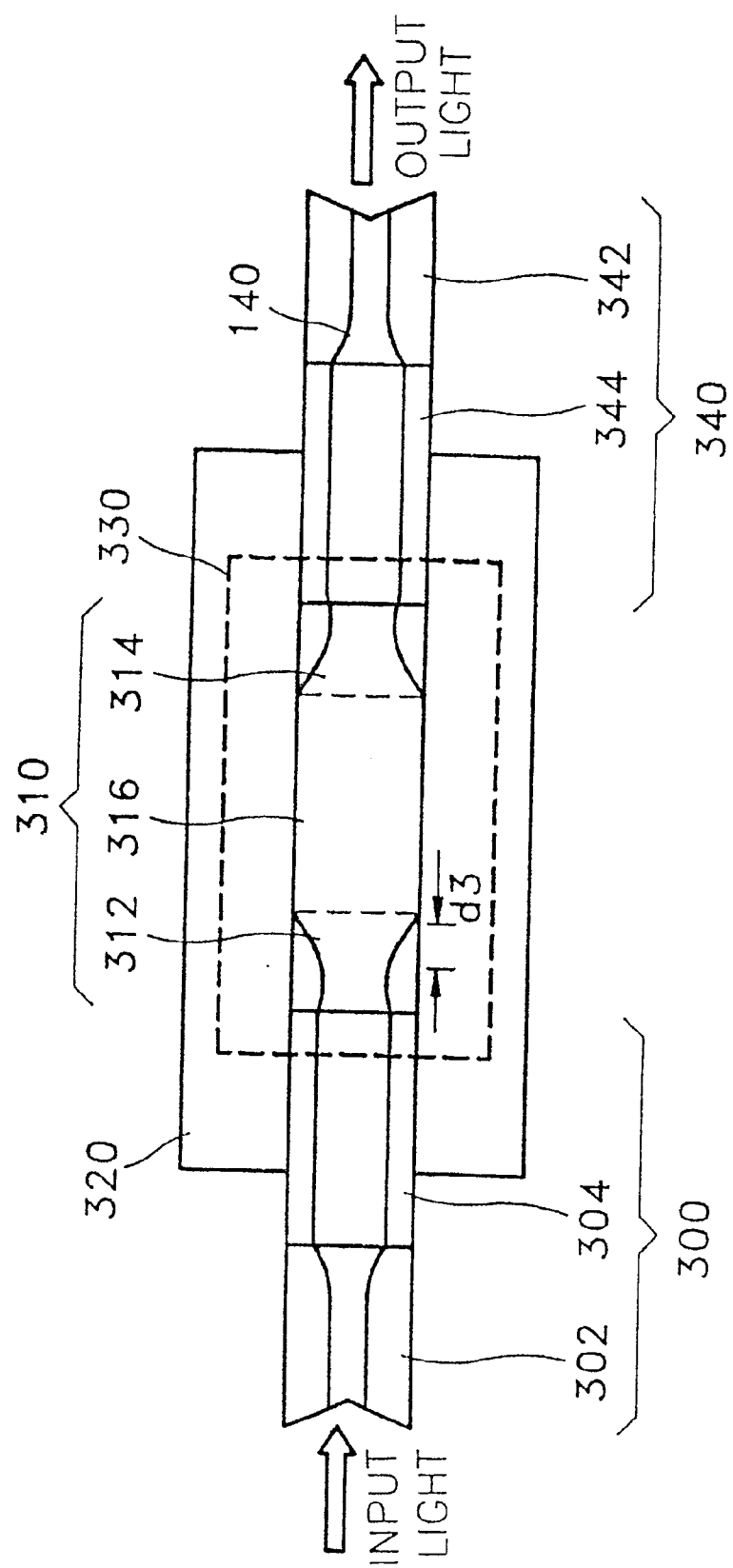
FIG. 3 shows the structure of a 1×1 optical coupler according to the present invention which accomplishes a modal evolution with an optical fiber, whose core is uniformly enlarged over the entire portion of the optical fiber, joining with an optical fiber having a core gradually and enlarged from a part of a communications optical fiber is positioned at the front end of an expanding element.

FIG. 3 shows the structure of a 1×1 optical coupler according to the present invention which accomplishes a modal evolution while an optical fiber, whose core is uniformly enlarged at the entire portion of the optical fiber, joining with an optical fiber having a core gradually enlarged from a part of a communications optical fiber and is positioned at the front end of an expanding element. Referring to FIG. 3, the 1×1 optical coupler includes first and second optical fibers 300 and 340, an expanding element 310, a channel transmission path 320 and a coverlet 330.

The first and second optical fibers 300 and 340 include connecting portions 302 and 342 which gradually, thermally expand a portion of a core to accomplish a modal evolution of a transmission light, and continued portions 304 and 344 which are respectively connected to the connecting portions 302 and 342 and keeps a consistent size for a predetermined length.

The expanding element 310 is placed between the first and second optical fibers 300 and 340, and is composed of an ultraviolet curing resin. When an ultraviolet ray is incident thereon and cured, the section areas of both ends are the same as those of the connecting portions 302 and 342 of the first and second expansion optical fibers 300 and 340. The expanding element 310 includes expansion portions 312 and 314 each shrunken and then expanded over a predetermined expansion distance (d3) starting from a portion connected to the first or second optical fiber 300 or 342, and a middle portion 316 which is installed between the expansion portions 312 and 314 connected to the first and second optical fibers 300 and 340 and keeps its size consistent for the expansion distance (d3). The expanding element 310 does not move in the expansion distance (d3). Also, the expanding element 310 has a shape which is uniformly kept after shrinking and gradually enlarged up to the predetermined distance and then reaches the wall of the rectilinear channel transmission path 320. In order to confine a transmission light internally to keep it traveling, the internal refractive index of the expanding element 310 is larger than that of the coverlet 330 installed outside the expanding element 310 and that of the rectilinear channel transmission path 320.

The channel transmission path 320 has two ends to which the continuing portions 304 and 344 of the first and second optical fibers 300 and 340 are respectively connected, and allows a transmission light to be output after the expanding element 310 is filled between the optical fibers placed on the ends thereof. The coverlet 330 is positioned on the channel transmission path 320 to fill the channel transmission path 320 with an ultraviolet curing resin without flowing out of the channel transmission path 320, simultaneously with the alignment of the first and second optical fibers.

Figure 4:
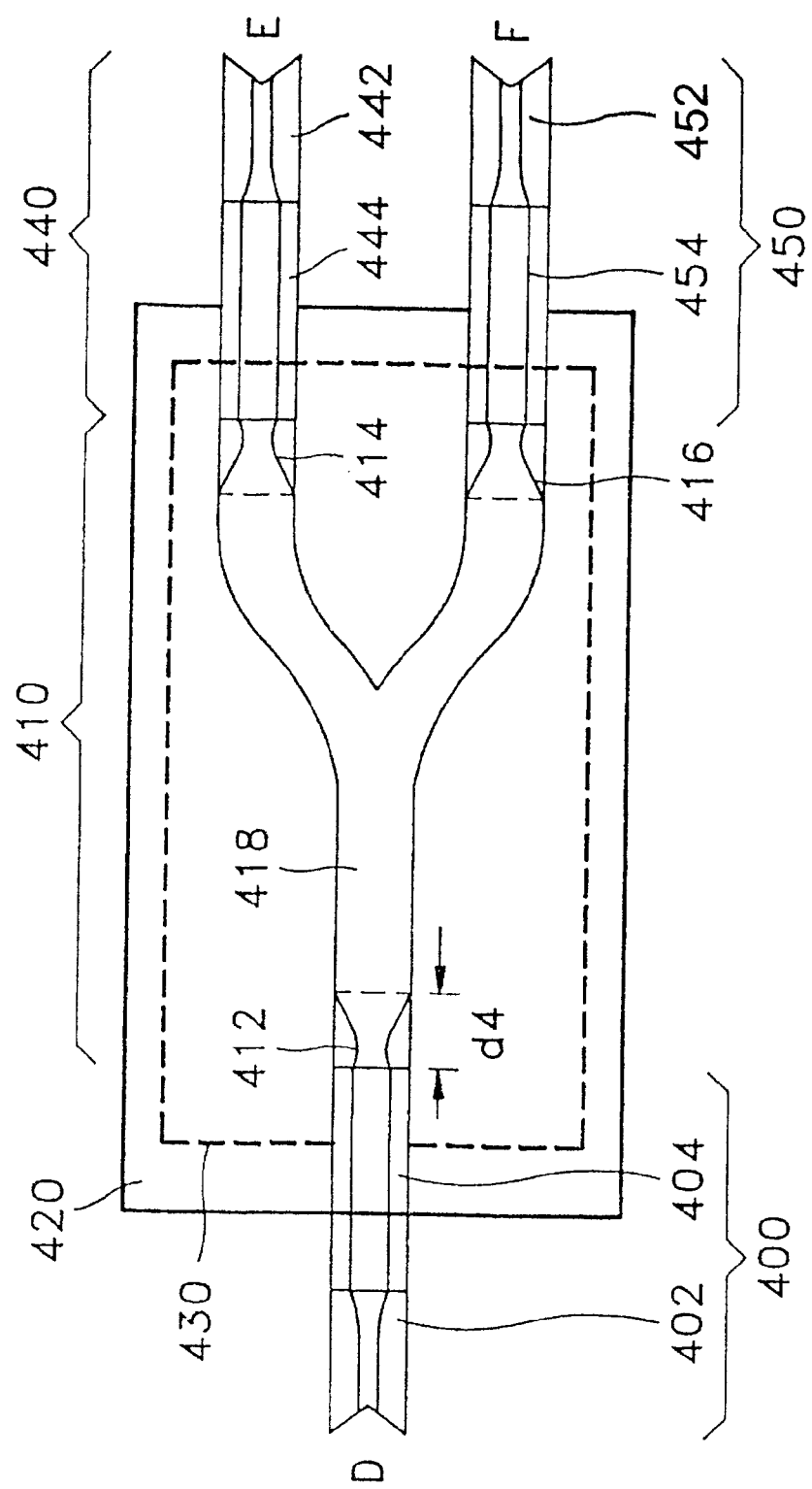
FIG. 4 shows the structure of a 1×2 optical coupler according to the present invention which accomplishes a modal evolution with an optical fiber, whose core is uniformly enlarged over the entire portion of the optical fiber, joining with an optical fiber having a core gradually and enlarged from a part of a communications optical fiber is positioned at the front end of an expanding element.

FIG. 4 shows the structure of a 1×2 optical coupler according to the present invention which accomplishes a modal evolution while an optical fiber, whose core is uniformly enlarged over the entire portion of the optical fiber, injunction with an optical fiber having a core gradually enlarged from a part of a communications optical fiber and is positioned at the front end of an expanding element. Referring to FIG. 4, the 1×2 optical coupler is comprised of first, second and third optical fibers 400, 440, and 450, an expanding element 410, a channel transmission path 420 and a coverlet 430.

The first, second and third optical fibers 400, 440 and 450 include connecting portions 402, 442 and 452 which gradually, thermally expand a part of a core to accomplish a modal evolution of a transmission light, and continued portions 404, 444 and 454 which are connected to the connecting portions 402, 442 and 452, respectively, and keep their size consistent for a predetermined length.

The expanding element 410 is Y-shaped, and one end connected to the continued portion 404 of the first optical fiber and two other ends respectively connected to the continued portions 444 and 454 of the second and third optical fibers. Also, the expanding element 410 is composed of an ultraviolet curing resin. When an ultraviolet ray is incident thereon and cured, the section areas of the respective three ends of the expanding element 410 are the same as the respective ends of the first, second and third expanded optical fibers 400, 440 and 450. The expanding element 410 is comprised of extended portions 412, 414 and 416 each shrunken and then expanded over a predetermined expansion distance (d4) starting from a portion connected to the first, second or third optical fiber 400, 440 or 450, and a middle portion 418 having a Y shape of an uniform size among the extended portions 412, 414 and 146 respectively connected to the continued portions 404, 444 and 454 of the first, second and third optical fibers. The expanding element 410 does not move in the expansion distance (d4). Also, the expanding element 410 is shrunken a predetermined distance and then gradually expanded, and then maintains its shape after reaching the wall of the Y-shaped channel transmission path 420. In order for the transmission light to be internally confined and kept traveling, the refractive index in the expanding element 410 is larger than that of the coverlet 430 installed outside the expanding element 410 and that of the Y-shaped channel transmission path 420.

The channel transmission path 420 has one end to which the continued portion 404 of the first optical fiber and the other end to which the continued portions 444 and 454 of the second and third optical fibers are connected. The channel transmission path 420 allows a transmission light to be output after the expanding element 410 is filled between the optical fibers placed on both ends thereof. The coverlet 430 is positioned on the channel transmission path 420 to fill the channel transmission path 420 with an ultraviolet curing resin without flowing out of the channel transmission path 420, simultaneously with the alignment of the first, second and third optical fibers 400, 440 and 450.

Figure 5:
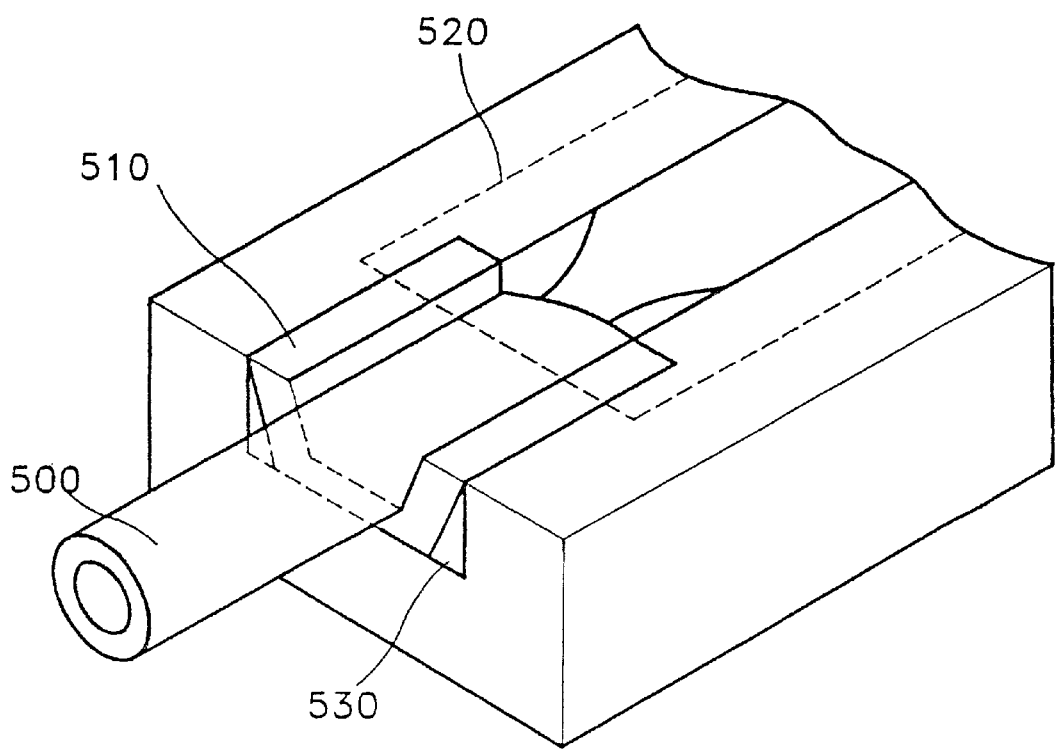
FIG. 5 is a perspective view showing the structure of an optical coupler in which optical fibers according to the present invention have a U- or V-shaped groove and can be self-aligned.
Figure 6:
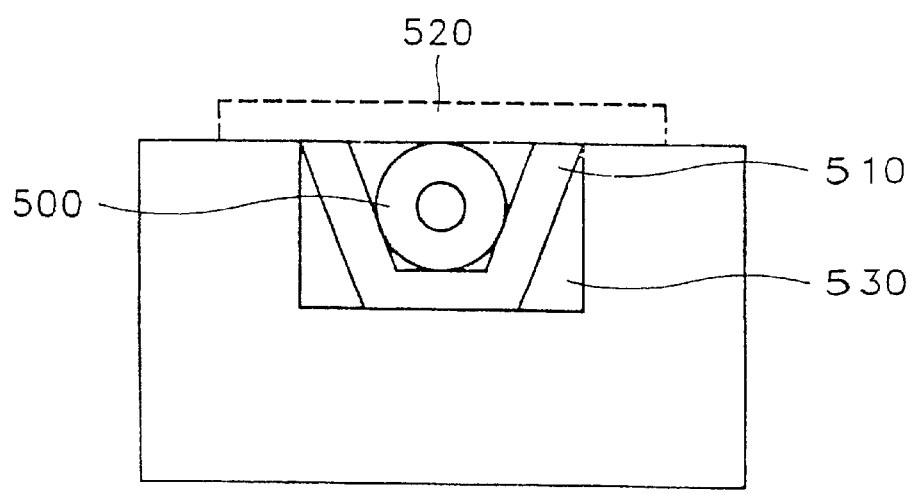
FIG. 6 is a front view of FIG. 5 according to the present invention.

FIG. 5 shows the structure of an optical coupler having a U- or V-shaped groove according to the present invention, whereby optical fibers can be self-aligned. Referring to FIG. 5, an optical coupler manufactured using a U- or V-shaped groove 510 is used to allow the optical fiber 500 to be self-aligned when an optical fiber 500 of FIGS. 1 through 4 having an expanded core is inserted into a resin monomer in a channel transmission path 530 of FIGS. 1 through 4 and installed in the channel transmission path. Coverlet 520 is analogous to coverlets 110, 250, 330 and 430. FIG. 6 is a front view of FIG. 5.

Also, the expanding elements 110, 230, 310 and 410 shown in FIGS. 1 through 4 can be formed of a material having a refractive index of 1.52 to 1.60, and may expand the core again after the core is pre-cured before the expansion of the core. Also, when an ultraviolet ray is incident into an optical fiber positioned in front of the expanding element to make a polymerized expanding element, the polymerized expanding element can be made by varying the incident angle of the ultraviolet ray. Furthermore, the expanding elements 110, 230, 310 and 410 can have a circular section or a rectangular section.

The channel transmission paths 130, 240, 320 and 420 shown in FIGS. 1 through 4 can be formed of a resin composed of a single component, a plurality of components, or a complex component having an adjustable refractive index which is 0.01 to 0.002 less than those of the expanding elements 110, 230, 310 and 410. Also, the channel transmission paths 130, 240, 320 and 420 can have a circular or rectangular section.

Also, the coverlet 120, 250, 330 and 430 shown in FIGS. 1 through 4 can be formed of a resin composed of a single component, a plurality of components, or a complex component having an adjustable refractive index which is 0.02 to 0.002 less than those of the expanding elements 110, 230, 310 and 410. The optical fibers 100, 140, 200, 210, 220, 300, 340, 400, 440 and 450 shown in FIGS. 1 through 4 can be installed in the channel transmission paths 130, 240, 320 and 420 using a snap-in method/push-in method for fixing the optical fiber to the channel transmission path by pressing down on the optical fiber. Also, the optical fibers 100, 140, 200, 210, 220, 300, 340, 400, 440 and 450 can be installed on the channel transmission paths 130, 240, 320 and 420 using an inserting method in which the channel transmission paths 130, 240, 320 and 420 with the coverlets 120, 250, 330 and 430 installed thereon are filled with a resin and the optical fibers are then inserted into the resin in the channel transmission paths 130, 240, 320 and 420. Furthermore, when the optical fibers 100, 140, 200, 210, 220, 300, 340, 400, 440 and 450 are inserted into the resin in the channel transmission paths 130, 240, 320 and 420 and then installed on the channel transmission paths 130, 240, 320 and 420, a U- or V-shaped groove can be used to allow the optical fibers 100, 140, 200, 210, 220, 300, 340, 400, 440 and 450 to be self-aligned.

The operation of the present invention will now be described. Referring to the operation of the optical coupler shown in FIG. 1, a transmitted light passes through the optical fiber 100 having a core that has been thermally expanded gradually to be enlarged at a portion of a communications optical fiber designed so that a mode can be evoluted while keeping a basic mode, and then is incident into the expanding element 130 polymerized by the ultraviolet irradiation. When the core of the optical fiber 100 is gradually expanded, the transmitted light is evoluted while maintaining the basic mode by minimizing the inclination angle and shortening the expansion distance of the core. The evoluted mode is incident into the expanding element 130, travels inside the expanding element 130 under conditions of total internal reflection of light, is incident into the optical fiber 140 having core-expanded a portion of an optical fiber opposing the optical fiber 140, and then is output by restoring it to the original state.

Referring to the operation of the optical coupler shown in FIG. 2, in the optical coupler of FIG. 2, a branching of A into B and C or a coupling of B and C into A occurs due to a mode field structure in which the electromagnetic fields of optical signals passing through the expanding element 230 in the Y-shaped channel transmission path 240 are combined with each other. First, the branching of A into B and C will be considered. A light transmitted from A passes through the optical fiber 200 having a core gradually, thermally expanded to be enlarged at a portion of a communication optical fiber designed so that a mode can be evoluted wile keeping a basic mode, and then is incident into the expanding element 230 polymerized by ultraviolet irradiation. When the core of the optical fiber 200 is gradually expanded, the transmitted light is evoluted with the basis mode being kept by minimizing the inclination angle and shortening the core expansion distance. The evoluted mode is incident into the expanding element 230, travels inside the expanding element 230 under conditions of total internal reflection of light, and is incident into the optical fibers 210 and 220 having core-expanded a part of an optical fiber opposing the optical fibers 210 and 220 with optical power being branched in identical amounts at a branching portion of the expanding element 230 in the Y-shaped channel transmission path 240. Then, the evoluted mode is restored back to the original state and output as B and C.

Next, the coupling of B and C to A will be considered. A light transmitted from B and C passes through the optical fibers 210 and 220 having a core gradually, thermally expanded to be enlarged at a portion of a communications optical fiber designed so that a mode can be evoluted while keeping a basic mode, and then is incident into the expanding element 230 polymerized by ultraviolet irradiation. The light evoluted while keeping the basic mode is incident into the expanding element 230 and travels inside the expanding element 230 under conditions of total internal reflection of light, and is incident into the optical fiber 200 having core-expanded a part of an optical fiber installed in opposite to the optical fiber 200 with mode fields being structurally combined at the coupling portion of the expanding element 230 in the Y-shaped channel transmission path 240. At this time, the evoluted mode is restored back to the original state, and output as A.

Referring to the operation of the optical coupler shown in FIG. 3, the transmitted light, which is evoluted while keeping the basic mode by minimizing the inclination angle of a core and shortening the expansion distance thereof when the core of the optical fiber 300 is gradually expanded, passes through the optical fiber 304 uniformly enlarged at the entire portion of the optical fiber during enlargement of the core. Then, the transmitted light is incident into the expanding element 310 polymerized by the UV irradiation. The light incident into the expanding element 310 is mode-evoluted once again. The section area of the expanding element 310 is the same as the core of the continued portion 304 of an optical fiber at a portion contacting the continued portion 304. However, the section area thereof is shrunk for a predetermined distance and gradually enlarged. Then, the expanding element 310 keeps the increased size after reaching the wall of the rectilinear channel transmission path 320. At this time, the incident light travels inside the expanding element 310 under conditions of total internal reflection of light by minimizing the inclination angle of a core and shortening the expansion distance thereof. The incident light is incident into the optical fiber 340 whose core is uniformly enlarged at the continued portion 344 opposing the continued portion 304. Thus, the evoluted mode is restored once again, and is restored again by the optical fiber 340 having core-expanded a part of itself and then output.

According to the optical coupler of FIG. 4, in the optical coupler of FIG. 4, a branching of D into E and F or a coupling of E and F into D occurs due to a mode field structure in which the electromagnetic fields of optical signals passing through the expanding element 410 in the Y-shaped channel transmission path 420 are combined with each other. First, the branching of D into E and F will be considered. A light is transmitted from D through the connecting portion 402 of the optical fiber 400 having thermally expanded a core to be gradually enlarged for a portion of a communications optical fiber designed so that a mode can be evoluted while keeping a basic mode. Then, the transmitted light passes through the optical fiber 400 uniformly enlarged by the continued portion 404 during enlargement of a core. Thereafter, the transmitted light is incident into the expanding element 410 polymerized by ultraviolet irradiation. The transmitted light is evoluted while keeping the basic mode by minimizing the inclination angle of a core and shortening the expansion distance thereof when the core of the optical fiber 400 is gradually expanded. The evoluted mode passes through the optical fiber 400 whose core is uniformly enlarged at the continued portion 404 of the optical fiber 400, and is then incident into the expanding element 410. The light incident into the expanding element 410 is mode-evoluted once again with keeping the basic mode. The section area of the expanding element 410 is the same as the core of the continued portion 404 of the optical fiber 400 at a portion contacting the continued portion 404. However, the section area thereof is shrunk for a predetermined distance and gradually enlarged. Then, the expanding element 410 keeps the increased size after reaching the wall of the Y-shaped channel transmission path 420. At this time, the incident light travels inside the expanding element 410 under conditions of total internal reflection of light by minimizing the inclination angle of a core and shortening the expansion distance thereof. The optical power is branched in equal amounts at the branching portion of the expanding element 410 in the Y-shaped channel transmission path 140. In such a state, the incident light is incident into the continued portions 444 and 454 of the optical fibers 440 and 450 whose cores are uniformly enlarged for the entire portions of the optical fibers 440 and 450 opposing the optical fiber 400. Thus, the evoluted mode is restored once again, and is secondly restored by the connection portions 442 and 452 of the optical fibers 440 and 450 having core-expanded a part of themselves and then output as E and F.

Next, the coupling of E and F to D will be considered. A light transmitted from E and F passes through the optical fibers 440 and 450, whose cores are uniformly enlarged at the optical fiber continued portions 444 and 454, via the optical fiber connection portions 442 and 452 having expanded a core at a portion of a communications optical fiber designed so that a mode can be evoluted while keeping a basic mode, and then is incident into the expanding element 410. The light incident into the expanding element 410 polymerized by UV irradiation is evoluted again keeping the basic mode and travels inside the expanding element 410 under conditions of total internal reflection of light. As mode fields are structurally combined at the coupling portion of the expanding element 410 in the Y-shaped channel transmission path 420, the incident light is incident into the optical fiber connection portion 402 whose core is uniformly expanded by the optical fiber continued portion 404 installed in opposite to the optical fiber continued portions 444 and 454. At this time, the evoluted mode is first restored to the original state by the optical fiber continued portion 404. Then, the mode is secondly restored by the optical fiber connection portion 402 which partially expanded the core of the optical fiber 400, and thus output as D.

According to the optical couplers of FIGS. 5 and 6, a U- or V-shaped groove 510 is used when the optical fiber 500 and a general communications optical fiber are inserted into a resin filled in a rectilinear or Y-shaped channel transmission path 530 to be installed on the rectilinear or Y-shaped channel transmission path 530. Therefore, the optical fiber can be fixed to the channel transmission path 530. Also, the precision of the connection between optical fibercores is increased, thus reducing a loss of light emission generated by inconsistencies between the optical fiber cores.

As described above, according to the present invention, the expansion distance of a core is long when the core is enlarged in the channel transmission path, in contrast to a conventional method. Thus, an expanding element formed by ultraviolet rays is prevented from moving. Also, a loss of transmitted light due to an influence of a resin existing between the section of an optical fiber and the wall of the channel transmission path is remarkably reduced. Furthermore, the use of the U- or V-shaped groove makes it possible for the optical fibers to be self-aligned and an emission loss is reduced.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A modal evolution optical coupler comprising:
   a first optical fiber which gradually, thermally expands a core to evolute the mode of a transmitted light;
   a second optical fiber which gradually, thermally expands a core to evolute the mode of a transmitted light;
   an expanding element which is disposed between said first and second optical fibers, and which is formed of an ultraviolet curing resin, and which has ends whose section areas are equal to the respective ends of said first and second expanded optical fibers when an ultraviolet ray is incident thereon and cured, and which includes expanded portions which are each expanded over a predetermined expansion distance starting from a connecting portion to said first or second optical fiber and a middle portion keeping its size constant for a predetermined length between said expanded portions of said first and second optical fibers, and does not move in said expansion distance;
   a channel transmission path which has two ends to which said first and second optical fibers are respectively connected and allows said transmitted light to be output after said expanding element is disposed between said optical fibers placed on said two ends thereof; and
   a coverlet positioned on said channel transmission path to enable a filling of said channel transmission path with an ultraviolet curing resin while aligning said first and second optical fibers and to prevent said resin from flowing out of said channel transmission path.

2. The modal evolution optical coupler as claimed in claim 1, one gradually-expanding end of each of said first and second optical fibers having a minimum difference in refractivity as compared to that of said expanding element.

3. The modal evolution optical coupler as claimed in claim 1, said expanding element being formed of a material having a refractive index in a range of between 1.52 and 1.60.

4. The modal evolution optical coupler as claimed in claim 3, said expanding element having a circular section.

5. The modal evolution optical coupler as claimed in claims 3, said expanding element having a rectangular section.

6. The modal evolution optical coupler as claimed in claim 1, said expanding element expanding the core of said first or second optical fiber after pre-curing said core.

7. The modal evolution optical coupler as claimed in claim 6, said expanding element having a circular section.

8. The modal evolution optical coupler as claimed in claims 6, said expanding element having a rectangular section.

9. The modal evolution optical coupler as claimed in claim 1, said expanding element is made into an expanding element polymerized by an ultraviolet ray incident into said optical fiber positioned at the front end of said expanding element, by varying an incidence angle of said ultraviolet ray.

10. The modal evolution optical coupler as claimed in claim 9, said expanding element having a circular section.

11. The modal evolution optical coupler as claimed in claims 9, said expanding element having a rectangular section.

12. The modal evolution optical coupler as claimed in claim 1, said channel transmission path being formed of one of a resin with a single component, a plurality of components, or a complex component and which has an adjustable refractive index 0.01 to 0.002 less than that of said expanding element.

13. The modal evolution optical coupler as claimed in claim 12, said channel transmission path having a circular section.

14. The modal evolution optical coupler as claimed in claim 12, said channel transmission path having a rectangular section.

15. The modal evolution optical coupler as claimed in claim 1, said coverlet being formed of one of a resin with a single component, a plurality of components, or a complex component and which has an adjustable refractive index 0.02 to 0.002 less than that of said expanding element.

16. The modal evolution optical coupler as claimed in claim 1, further comprising a U- or V-shaped groove placed on said channel transmission path, for containing said optical fiber enabling self-alignment when said optical fiber is inserted into the resin existing in said channel transmission path and installed on said channel transmission path.

17. A method of manufacturing a modal evolution optical coupler, comprising the steps of:

installing an optical fiber on an channel transmission path;

placing an optical transmission medium as a core expanding element having an expanded portion which expands over a predetermined expansion distance starting from a connecting portion to the optical fiber and a middle portion having constant size for a predetermined length, on said channel transmission path; and covering a part of said optical fiber and said core expanding element with a coverlet;

said step of installing said optical fiber on said channel transmission path being performed using a method for fixing said optical fiber to said channel transmission path by pressing on said optical fiber.

18. A method of manufacturing a modal evolution optical coupler comprising:

a first optical fiber which gradually, thermally expands a core to evolute the mode of a transmitted light; a second optical fiber which gradually, thermally expands a core to evolute the mode of a transmitted light; an expanding element which is disposed between said first and second optical fibers, and which is formed of an ultraviolet curing resin, and which has ends whose section areas are equal to the respective ends of said first and second expanded optical fibers when an ultraviolet ray is incident thereon and cured, and which includes expanded portions which are each expanded over a predetermined expansion distance starting from a connecting portion to said first or second optical fiber and a middle portion keeping its size constant for a predetermined length between said expanded portions of said first and second optical fibers, and does not move in said expansion distance; a channel transmission path which has two ends to which said first and second optical fibers are respectively connected and allows said transmitted light to be output after said expanding element is disposed between said optical fibers placed on said two ends thereof; and a coverlet positioned on said channel transmission path to enable a filling of said channel transmission path with an ultraviolet curing resin while aligning said first and second optical fibers and to prevent said resin from flowing out of said channel transmission path, the method comprising the steps of:

placing said coverlet on said channel transmission path;

filling said channel transmission path with said resin; and inserting said first and second optical fiber into said resin existing in said channel transmission path.

19. A modal evolution optical coupler in which an optical signal is branched or branched signals are coupled, comprising:

a first optical fiber which gradually, thermally expands a core to evolute the mode of a transmitted light;

a second optical fiber which gradually, thermally expands a core to evolute the mode of a transmitted light;

a third optical fiber which gradually, thermally expands a core to evolute the mode of a transmitted light;

a Y-shaped expanding element which has one end connected to said first optical fiber and two other ends respectively connected to said second and third optical fibers, and which is formed of an ultraviolet curing resin, and having three ends in which each section area thereof is the same as each end of said first, second and third expanded optical fibers when an ultraviolet ray is incident thereon and cured, including expansion portions which are each expanded over a predetermined expansion distance starting from a connecting portion to said first, second or third optical fiber and a Y-shaped middle portion keeping its size constant between said expanded portions of said first, second and third optical fibers, and which does not move in said expansion distance;

a channel transmission path which has one end to which said first optical fiber is connected and another end to which said second and third optical fibers are connected, and which allows said transmitted light to be output after said expanding element is disposed between said optical fibers placed on said both ends thereof; and a coverlet positioned on said channel transmission path to enable a filling of said channel transmission path with an ultraviolet curing resin while aligning said first, second and third optical fibers and to prevent said resin from flowing out of said channel transmission path.

20. A modal evolution optical coupler comprising:

a first optical fiber having a connection portion which gradually, thermally expands a part of core to evolute the mode of a transmitted light and a continued portion which is connected to said connection portion and keeps its size constant for a predetermined length;

a second optical fiber having a connection portion which gradually, thermally expands a part of core to evolute the mode of a transmitted light and a continued portion which is connected to said connection portion and keeps its size constant for a predetermined length;

an expanding element which is disposed between said first and second optical fibers, and which is formed of an ultraviolet curing resin, having two ends whose section areas are the same as the respective ends of said first and second expanded optical fibers when an ultraviolet ray is incident thereon and cured, including expanded portions which are each shrunk and again expanded over a predetermined expansion distance starting from a connecting portion to said first or second optical fiber and a middle portion keeping its size constant for a predetermined length between said expanded portions of said first and second optical fibers, and which does not move in said expansion distance;

a channel transmission path which has two ends to which said continued portions of said first and second optical fibers are respectively connected and allows said transmitted light to be output after said expanding element is disposed between said optical fibers placed on said two ends thereof; and a coverlet positioned on said channel transmission path to enable a filling of said channel transmission path with an ultraviolet curing resin while aligning said first and second optical fibers and to prevent said resin from flowing out of said channel transmission path.

21. A modal evolution optical coupler in which an optical signal is branched or branched signals are coupled, comprising:

a first optical fiber having a connection portion which gradually, thermally expands a part of core to evolute the mode of a transmitted light and a continued portion which is connected to said connection portion and keeps its size constant for a predetermined length;

a second optical fiber having a connection portion which gradually, thermally expands a part of core to evolute the mode of a transmitted light and a continued portion which is connected to said connection portion and keeps its size constant for a predetermined length;

a third optical fiber having a connection portion which gradually, thermally expands a part of core to evolute the mode of a transmitted light and a continued portion which is connected to said connection portion and keeps its size constant for a predetermined length;

a Y-shaped expanding element which has one end connected to said continued portion of said first optical fiber and two other ends respectively connected to said continued portions of said second and third optical fibers, formed of an ultraviolet curing resin, having three ends whose each section area is the same as each end of said first, second and third expanded optical fibers when an ultraviolet ray is incident thereon and cured, including expanded portions which are each first shrunk and then expanded over a predetermined expansion distance starting from a connecting portion to said first, second or third optical fiber and a Y-shaped middle portion keeping its size constant between said expanded portions connected to said continued portions of said first, second and third optical fibers, and which does not move in said expansion distance;

a channel transmission path which has one end to which said continued portion of said first optical fiber is connected and another end to which said continued portions of said second and third optical fibers are connected, and which allows said transmitted light to be output after said expanding element is disposed between said optical fibers placed on said both ends thereof; and a coverlet positioned on said channel transmission path to enable a filling of said channel transmission path with an ultraviolet curing resin while aligning said first, second and third optical fibers and to prevent said resin from flowing out of said channel transmission path.

22. A method of manufacturing a modal evolution optical coupler, comprising the steps of:

installing a coverlet on a channel transmission path of the optical coupler;

after installing the coverlet filling the channel transmission path with a photocurable resin;

after filling the transmission path, inserting the ends of optical fibers into the channel transmission path, the end of each fiber having a gradually, thermally expanded core; and passing ultraviolet light through the optical fibers to cure the resin to form an expanding element in the channel transmission path, said expanding element being formed between the optical fibers and having ends whose section areas are equal to the respective ends of the optical fibers, and including expanded portions extending from the optical fibers over a predetermined distance to a middle portion, said middle portion having constant size over the length of the middle portion.

* * * * *